United States Patent
Lacy

(10) Patent No.: US 7,516,180 B2
(45) Date of Patent: Apr. 7, 2009

(54) SYSTEM AND METHOD FOR PROVIDING INSTRUCTOR SERVICES USING A PLURALITY OF CLIENT WORKSTATIONS CONNECTED TO A CENTRAL CONTROL STATION

(76) Inventor: Donald D. Lacy, 11300 Wilson Rd., Utica, OH (US) 43080

( * ) Notice: Subject to any disclaimer, the term of this patent is extended or adjusted under 35 U.S.C. 154(b) by 666 days.

(21) Appl. No.: 10/353,342

(22) Filed: Jan. 28, 2003

(65) Prior Publication Data

US 2004/0148350 A1      Jul. 29, 2004

(51) Int. Cl.
   *G06F 15/16*      (2006.01)
(52) U.S. Cl. ................. 709/205; 434/346; 434/358; 434/348; 434/362
(58) Field of Classification Search ......... 709/203–205; 434/350, 362–36; 706/927, 45
   See application file for complete search history.

(56) References Cited

U.S. PATENT DOCUMENTS

| | | | |
|---|---|---|---|
| 4,682,164 A | | 7/1987 | Lacy |
| 4,715,818 A | | 12/1987 | Shapiro et al. |
| 4,759,717 A | | 7/1988 | Larochelle et al. |
| 5,864,623 A | | 1/1999 | Messina et al. |
| 6,029,043 A | * | 2/2000 | Ho et al. .................... 434/350 |
| 6,146,148 A | * | 11/2000 | Stuppy ...................... 434/322 |
| 6,411,796 B1 | * | 6/2002 | Remschel .................. 434/350 |
| 6,652,284 B2 | | 11/2003 | August et al. |
| 6,652,287 B1 | | 11/2003 | Strub et al. |
| 6,823,363 B1 | | 11/2004 | Noveck et al. |
| 6,885,844 B2 | | 4/2005 | Roschelle et al. |
| 6,909,874 B2 | * | 6/2005 | Holtz et al. ................. 434/362 |
| 6,986,664 B1 | * | 1/2006 | Thomas ...................... 434/322 |
| 7,031,651 B2 | | 4/2006 | McCormick et al. |
| 2002/0182578 A1 | * | 12/2002 | Rachman et al. ............. 434/350 |
| 2003/0198935 A1 | * | 10/2003 | Wen et al. .................... 434/350 |

OTHER PUBLICATIONS

Applied Computer Systems, Inc.; Applied Computer Systems, Inc. Corporate Profile; Jan. 1, 2002; 14 pages.
Applied Computer systems, Inc.; Computer Software Manual for use with the Computer Controlled Link Systems; 23 pages.
Donald Lacy; Student Attendance, Testing and Tracking; Jul. 1, 2002; 5 pages.

* cited by examiner

*Primary Examiner*—Jude Jean-Giles
(74) *Attorney, Agent, or Firm*—Merchant & Gould P.C.

(57) ABSTRACT

A system for connecting a plurality of computing systems to a single network for providing instructor services in distributed computing environment. The system includes a plurality of client workstations; a control unit for configuring the operation of the plurality of client workstations; and a communications network for transmission of data and commands between the control unit and the plurality of client workstations, the communications network being a TCP/IP based communications network. The control unit presents test questions to users on one, any, or all of the plurality of client workstations. Each of the plurality of client workstations accepts responses from users to the questions presented. Each of the plurality of client workstations provides status of the responses received from the users to the test questions and the control unit maintains a real-time display of the status of users taking a test consisting of the test question present.

20 Claims, 7 Drawing Sheets

SYSTEM AND METHOD FOR PROVIDING INSTRUCTOR SERVICES USING A PLURALITY OF CLIENT WORKSTATIONS CONNECTED TO A CENTRAL CONTROL STATION

TECHNICAL FIELD

The present invention relates to a system and method for providing instructor services using a plurality of computing systems connected over a wireless communication network. One example application includes a system within an educational setting. In particular, one example system is a system that permits a central control station to obtain attendance, testing and tracking status information from an instructor operating a central control unit from one or more client workstations communicating over a wireless communications network.

BACKGROUND

The use of computer workstations within educational and training systems used in schools, military, commercial, college and university settings have been viewed for a long time as a mechanism to improve the instruction that may be provided to students and trainees. In these settings, a teacher or instructor would benefit from the ability to observe the actions occurring on a student's workstation, to control the inputs, provided to a workstation, and to generate a sequence of multimedia data, including video and audio data, that is presented to the student on a workstation display device.

In the past, elaborate wired systems have been needed to be constructed to implement such a system. An example of such a prior system may be found within a commonly assigned U.S. Pat. No. 4,682,164. This system utilizes a large number of physical electrical connections that connect the individual workstations to a central control unit. Such systems require a large infrastructure consisting of these connections to be installed wherever the workstations are to be utilized. In addition, the workstations become difficult to move as the physical connections would need to be moved or changed when a workstation is moved.

Wireless communications networks are now beginning to permit computing systems such as the student workstations to become mobile. If such connections were used in educational settings, the student workstations would become mobile while reducing the infrastructure requirements in that the complex wiring systems of the prior art would not be needed. Wireless networks operate using a shared communications medium rather than a plurality of separate connections.

Once a plurality of workstations are connected using such a network, additional instructor services related to obtaining and maintaining attendance records, providing quiz and testing operations, and monitoring the status of student and trainee activities is desired. The operation of any such system that combines the functionality of prior art systems with wireless networks would need to address how these signals are transmitted over a shared communications connection. The present invention described herein addresses these limitations of the prior art to create such a wireless system for use in an educational setting.

SUMMARY

The present disclosure includes a system for connecting a plurality of computing systems to a single network for providing instructor services in a distributed computing environment. The system includes a plurality of client workstations; a control unit for configuring the operation of the plurality of client workstations; and a communications network for transmission of data and commands between the control unit and the plurality of client workstations, the communications network being a TCP/IP based communications network. The control unit presents test questions to users on one of the plurality of client workstations. Each of the plurality of client workstations accepts responses from users to the questions presented. Each of the plurality of client workstations provides status of the responses received from the users to the test questions and the control unit maintains a real-time display of the status of users taking a test consisting of the test question present.

The present disclosure also includes a method for connecting a plurality of computing systems to a wireless network for providing instructor services in distributed computing environment. The method generates test questions and stores questions within a question database; retrieves test questions from the question database and orders questions to create a test for a student, transmits a sequence of questions from a control unit and a client workstation; records the students responses to the questions as the answers are generated; transmits student answers from client workstations to the control unit workstation; presents status information to the instructor in control unit workstation; and once the test is completed, completes scoring and records results.

BRIEF DESCRIPTION OF THE DRAWINGS

In the drawings, wherein like reference letters and numerals indicate corresponding elements throughout the several views.

DETAILED DESCRIPTION

Figure 1:
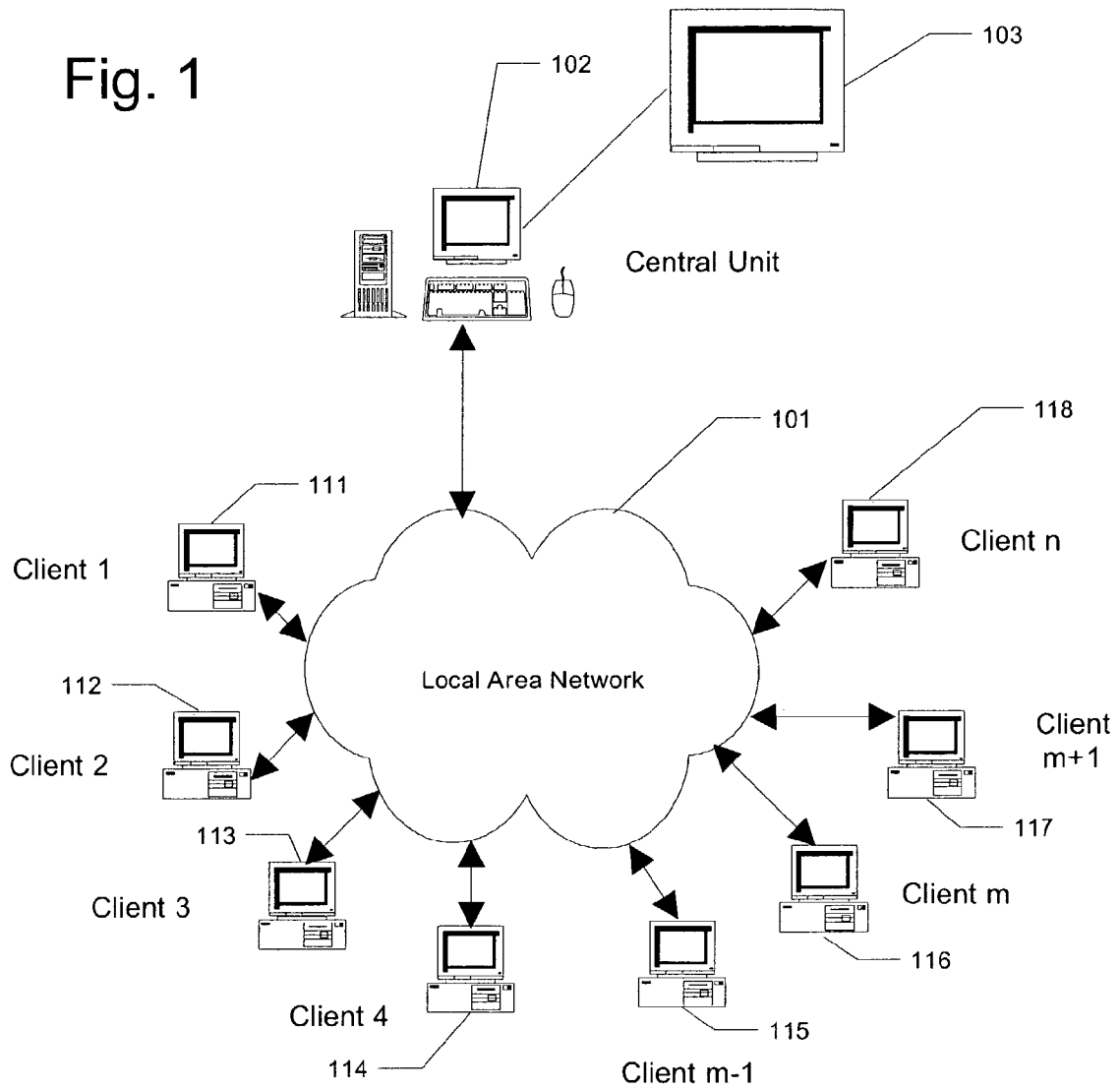
FIG. 1 illustrates a system for permitting a central control station to control the operation of one or more client workstations communicating over a wireless communications network in accordance with the invention.

The present invention relates to a system and method for connecting a plurality of computing systems. FIG. 1 illustrates a system for permitting a central control station to control the operation of one or more client workstations communicating over a wireless communications network in accordance with the invention. One example can be an educational setting where the client workstations correspond to student workstations. Such a system includes a central unit 102 that is connected to a local area communications network 101. A plurality of student workstations 111-118 are also connected to the local area network 101 to permit transmission of data between the central unit 102 and one or more of the student workstations 111-118. In a preferred embodiment, this communications network is a wireless communications network such as one constructed using the IEEE 802.11a or 802.11b wireless communications standard. One skilled in the art will, of course, recognize that other communication protocols and other communications media such as wired Ethernet, IR communications networks, and similar communications mechanisms may be used without deviating from the spirit and scope of the present invention as recited within the attached claims.

Once the various workstation units are in communications with each other, various processing modules executing within these workstations may obtain and record the activities and status of the users of the individual work stations as well and report the status information to a central control unit workstation for use by an instructor for the users of the client workstations. The data collection and reporting activities may be in addition to other cooperative data generation, transfer and display functions present in such a distributed processing system.

Figure 2:
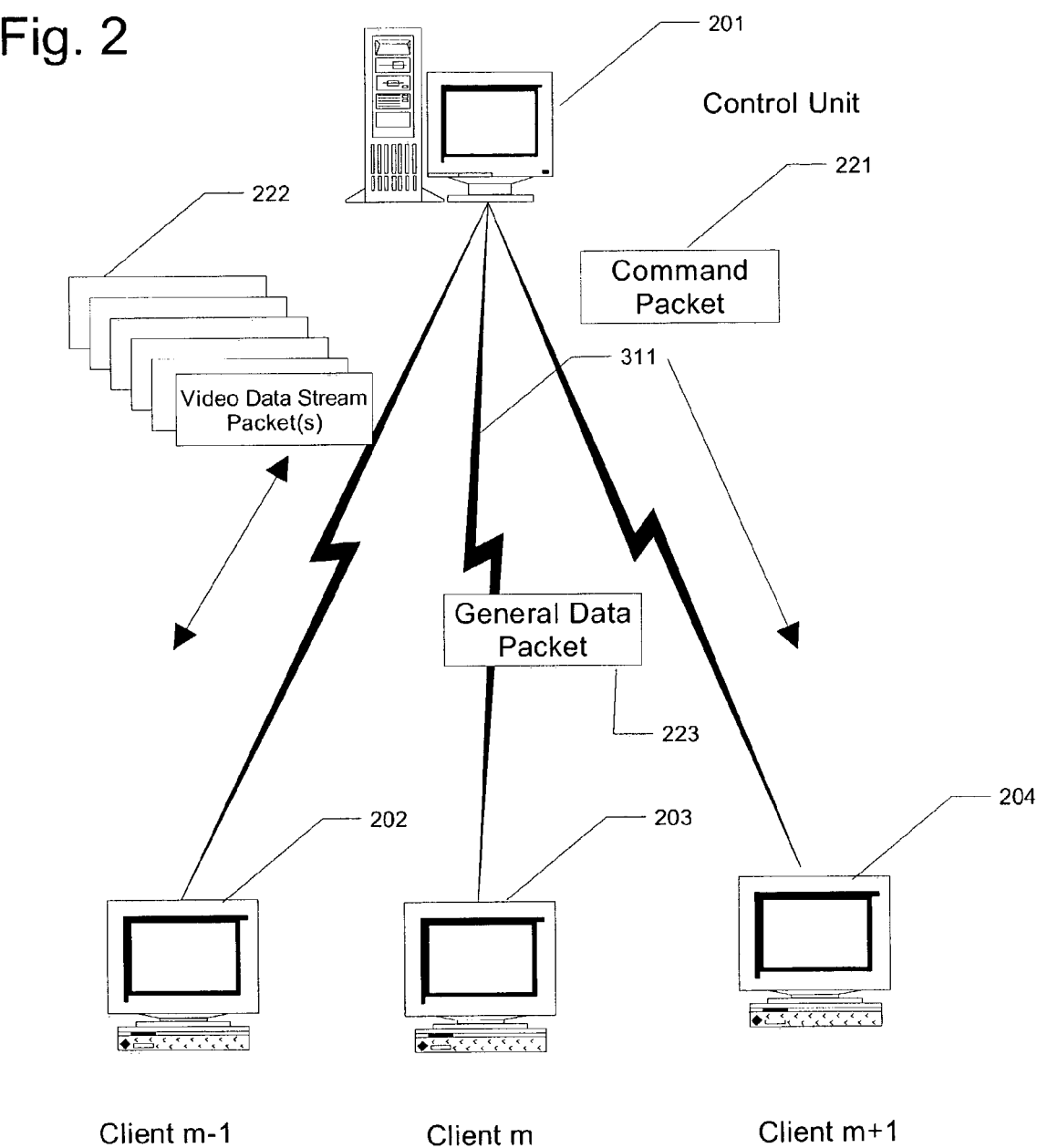
FIG. 2 illustrates another embodiment of a system for permitting a central control station to control the operation of one or more client workstations communicating over a wireless communications network in accordance with the invention.

FIG. 2 illustrates another embodiment of a system for permitting a central control station to control the operation of one or more client workstations communicating over a wireless communications network in accordance with the invention. This embodiment of the system includes a control unit 201 and three client workstations 202-204. The control unit 201 configures the operation of one or more of the workstations 202-204 by transmitting a command packet 221 to each of the workstations 202-204 that are to be configured. These commands may be either as a sequence of command packets to each individual workstation or a broadcast command packet to all of the workstations.

Once the workstations have been configured, the control unit 201 may initiate the transmission of data, such as a sequence of video data stream packets between the control unit 201 and at least one of the workstations 202-204. This sequence of data may flow between these units for a fixed period of time, or sequence of video images, or until a command packet 221 is transmitted to terminate the data transfer.

The data packets may be transmitted in either direction between a control unit 201 and a client workstation 202 to allow a teacher to see the images present on a student's workstation 202 or to allow a teacher to generate the images that are presented to the student. This data may also include commands that allow a control unit 201 to provide input to a workstation 202 that appears to an application running on the workstation 202 to have been generated by a keyboard, mouse input, touch screen or similar input device. As such, a teacher may remotely control a student workstation's operation using the control unit 201 to provide input expected by a programming executing on the workstation 202.

Because the communications network typically utilizes a TCP/IP communications protocol, the individual workstations 202-204 are functionally identified by the control unit 201 using each workstation's individual IP address. TCP/IP is the well known Transmission Control Protocol-Internet Protocol. TCP/IP is the common language of the Internet and most other computer networks, and by using it, computers of many different kinds may communicate. As such, any number of workstations may be added to the network as long as unique addresses are available. All command packets are transmitted to a particular workstation by sending the packet to a particular IP address. While other workstations will receive the packet, only the workstation that has the corresponding IP address will process the command packet. Using this configuration, the operation of the system as disclosed below may occur.

The above two types of data communication may be useful in transferring and displaying multimedia data that is generated on one workstation, either the instructor's control unit or one of the trainee's client workstations, for display on a second workstation. In addition, general data packets 223 may be transferred between workstations to allow for any other of cooperative processing operations to occur. The use of the multimedia data packets, along with the control packets, is described in more detail in a commonly assigned co-pending patent application titled SYSTEM AND METHOD FOR CONNECTING A PLURALITY OF CLIENT WORKSTATIONS TO A CENTRAL CONTROL STATION, Ser. No. 10/353,278, filed Jan. 28, 2003, which is incorporated herein by reference.

Figure 3:
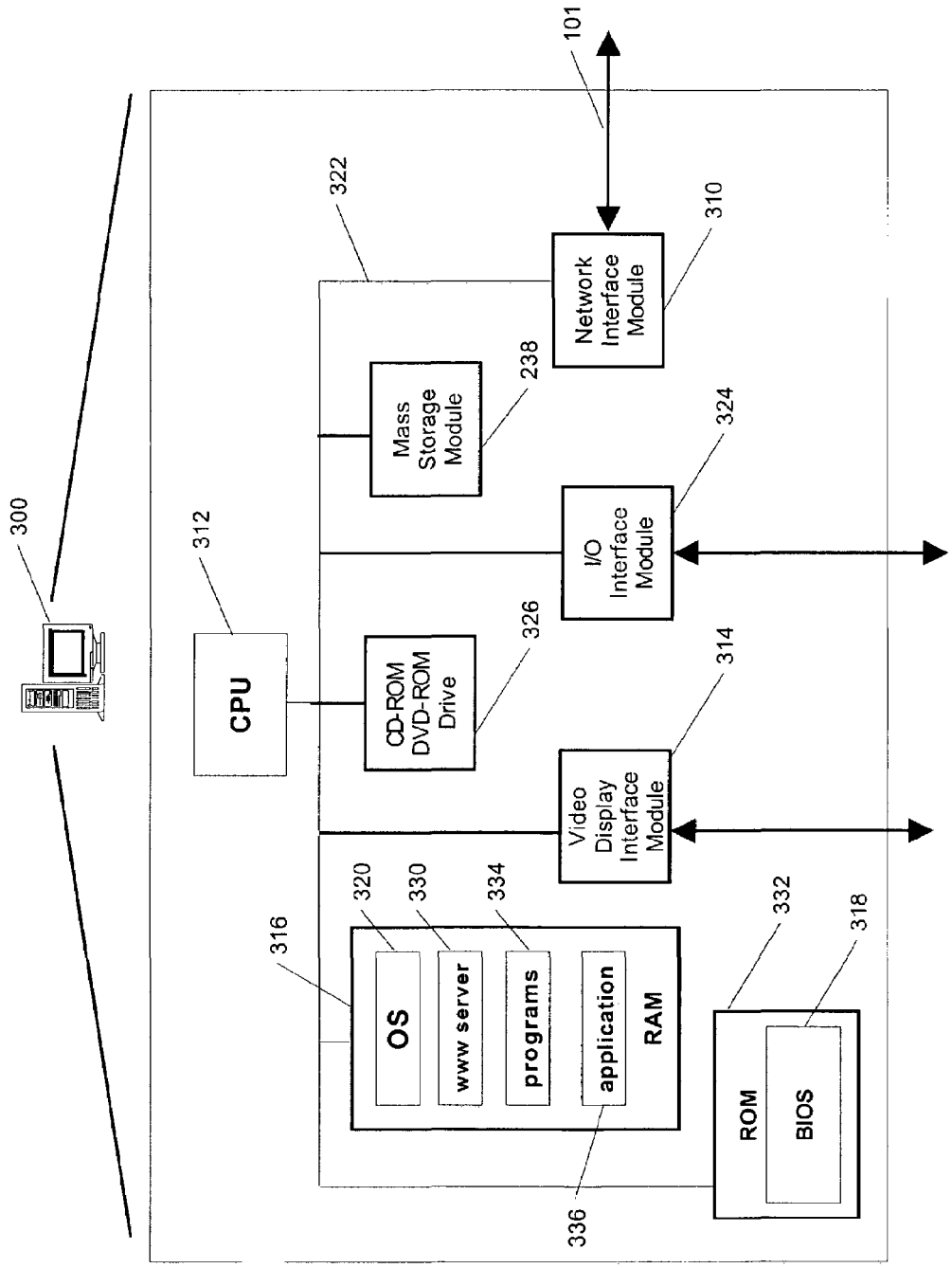
FIG. 3 illustrates an embodiment of a general purpose computing system used as part of a system for configuring an optical circuit in accordance with the invention.

FIG. 3 illustrates an embodiment of a general purpose computing system used as part of a system for configuring a wireless network circuit in accordance with the invention. As shown in FIG. 3, the master controller processing system 300 is connected to a WAN/LAN 101, or other communications network, via a network interface unit 310. Those skilled in the art will appreciate that network interface unit 310 includes the necessary circuitry for connecting a processing system to WAN/LAN 101, and is constructed for use with various communication protocols including the TCP/IP protocol. Typically, network interface unit 310 is a card contained within the processing system 300.

The processing system 300 also includes processing unit 312, video display adapter 314, and a mass memory, all connected via bus 322. The mass memory generally includes RAM 316, ROM 332, and one or more permanent mass storage devices, such as hard disk drive 328, a tape drive (not shown), CD-ROM/DVD-ROM drive 326, and/or a floppy disk drive. The mass memory stores operating system 320 for controlling the operation of master controller processing system 300. It will be appreciated that this component may comprise a general purpose server operating system as is known to those skilled in the art, such as UNIX, LINUX™, MAC OS®, or Microsoft WINDOWS NT®. Basic input/output system ("BIOS") 318 is also provided for controlling the low-level operation of master controller processing system 300.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data for providing a master controller processing and network development. More specifically, the mass memory stores applications including master controller processing module 330, programs 334, and other applications 336. Processing module 330 includes computer executable instructions which, when executed by master controller processing system 300, performs the logic described above.

The processing system 300 also comprises input/output interface 324 for communicating with external devices, such as a mouse, keyboard, scanner, or other input devices not shown in FIG. 3. Likewise, master controller processing system 300 may further comprise additional mass storage facilities such as CD-ROM/DVD-ROM drive 326 and hard disk drive 328. Hard disk drive 328 is utilized by master controller processing system 300 to store, among other things, application programs, databases, and program data used by master controller processing module 330. For example, customer databases, product databases, image databases, and relational databases may be stored. The operation and implementation of these databases is well known to those skilled in the art.

One skilled in the art may readily recognize that a processing system 300 may possess only a subset of the components described above without deviating from the spirit and scope of the present invention as recited within the attached claims. For example, in one embodiment, the mass storage devices for the master controller processing system 300 may be eliminated with all of the data storage being provided by solid state memory. Programming modules may be stored in ROM or EEPROM memory for more permanent storage where the programming modules consist of firmware that is loaded or updated infrequently. Similarly, as an embedded processing system, many of the user interface devices such as input devices and display devices may also not be present.

Figure 4:
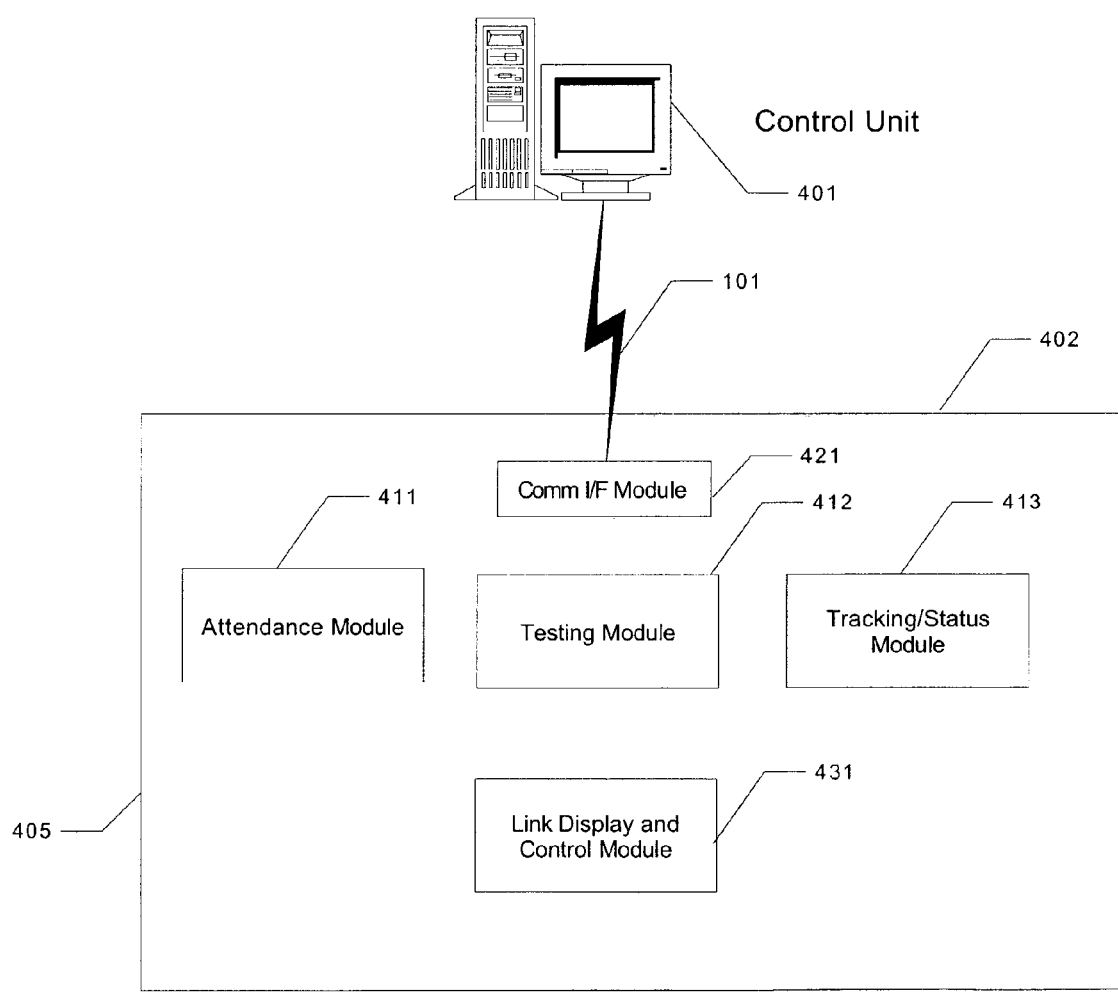
FIG. 4 illustrates a set of processing modules utilized within a client workstation unit configured in accordance with an embodiment of the present invention.

FIG. 4 illustrates a set of processing modules utilized within a client workstation unit configured in accordance with an embodiment of the present invention. Within a client workstation 402, a number of processing modules are used to provide instructor services to a central control unit workstation 401 over a communications network 101. These modules include an attendance module 411, a testing module 412, a tracking/status module 413, and a link display and control module 431. The operation of the link display and control module 431 is described in more detail in the previously referenced related patent application titled SYSTEM AND METHOD FOR CONNECTING A PLURALITY OF CLIENT WORKSTATIONS TO A CENTRAL CONTROL STATION.

The attendance module 411 will periodically record the student/trainee's attendance as measured by the log-in status and on-going activity of the student at a client workstation. The testing module 412 provides a mechanism for providing testing of students using their individual workstations 402 under the control of the instructor's central control unit workstation 401. The tracking/status module 413 provides an instructor with real-time status of the on-going activity of a student as he or she works on an individual client workstation 402. All of these modules operate in cooperation with processing modules on the central control unit workstation using electronic communications via a communication interface module 421. All of these processing modules are described in additional detail below.

Figure 5:
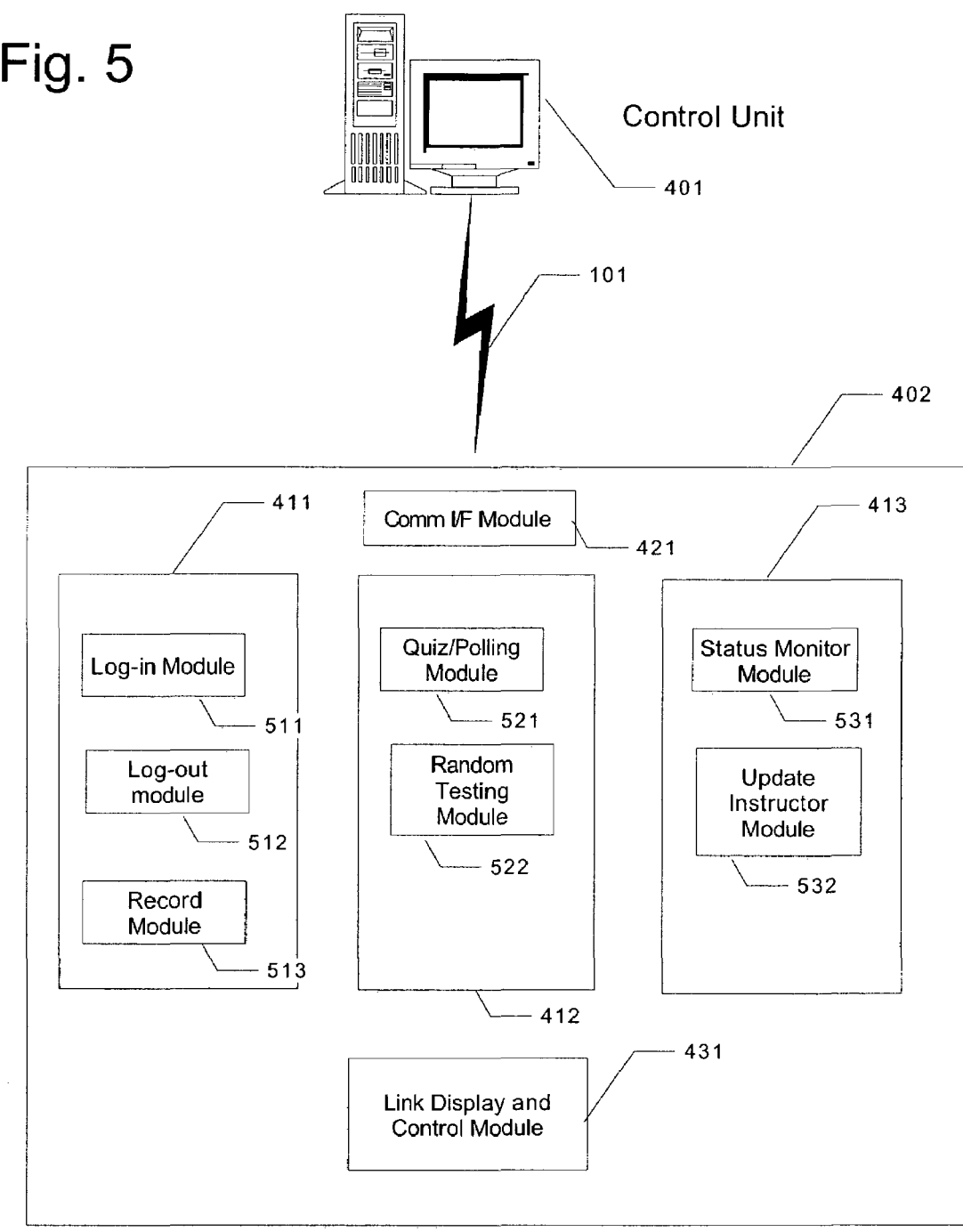
FIG. 5 illustrates a detailed set of processing modules utilized within a client workstation unit operating in various data communication modes in accordance with the present invention.

FIG. 5 illustrates a detailed set of processing modules utilized within a client workstation unit operating in various data communication modes in accordance with the present invention. As discussed above, these modules include the attendance module 411, the testing module 412, and the tracking/status module 413. Each of these modules are constructed from a set of sub-modules that implement the various parts of their operation.

The attendance module 411 includes a log-in module 511, a log-out module 512, and a record module 513. The log-in module 511 and the log-out module 512 are used to authenticate and authorize a student to access processing resources on a workstation. These modules use an account ID and password to determine the identity of the user logging into a workstation and this identity is used to determine what processing may be performed. This identity may also be used by the record module 513 to maintain a record of the date and time when a user is actively using a client workstation. This record may be checked periodically to record a student's attendance during a particular class, activity and test. In addition, the record module 513 may record this attendance information every hour, day, and user defined time interval to maintain a record of the attendance at any desired point in time.

The testing module 412 provides a mechanism for an instructor to measure the performance of any student using a client workstation. This module includes a quiz/polling module 521 and a random testing module 522 to perform these functions. The quiz/polling module 521 enables the instructor to send spontaneous quizzes in a form of one or more questions, pre-prepared quizzes, and polling/survey questions to individual and groups of students using the client workstations. These questions are typically in a form of multiple-choice, true/false and yes/no questions where the students' responses are automatically graded and results recorded by the central control unit workstation. Additionally, fill-in-the blank and essay questions may also be presented with the student responses recorded for later inspection and grading by the instructor.

The random testing module 522 presents students with a set of test questions on a client workstation and records the results. The questions are presented in a random order so that no two students receive the questions in the same order to reduce the possibility of cheating by the students. The students may proceed through the set of questions at their own pace with the computing system recording the answers of the students. During this time period, the status of the students' progress is maintained and the status information is made available to the instructor on the central control unit workstation. Students are permitted to return to any question and review the previously generated answer as well as change their answer until the entire test is completed.

The central control unit workstation may score the answers in real-time as the students enter their answers. Alternatively, the central control unit workstation may score the results in a batch mode once a testing time has ended. The results of the testing may be made available to the students on the client workstation, to the instructor on the control unit workstation, or transferred to other computing systems for recording and presentation. Of course, the results may be output to an output device such as a printer to generate a hard-copy results for the test.

The tracking/status module 413, collects the status of a student as he or she progresses through a test and forwards the information periodically to the central control unit workstation for display as part of a real-time status board to allow an instructor to monitor the progress of an entire group of students taking a test. This data may be periodically transferred from the client workstations to the control unit workstations at pre-set time intervals, or may be transferred every time a student enters and changes an answer. The results of the scoring may be generated and displayed as part of this status information if desired.

This module 413 includes a status monitoring module 531 that collects the status information of the students' progress as a test in being taken. The module 413 also includes an update instructor module 532 that communicates the status information generated by the update instructor module 532 to the control unit workstation 401 over a communications network 101 via the communications interface module 421.

Figure 6:
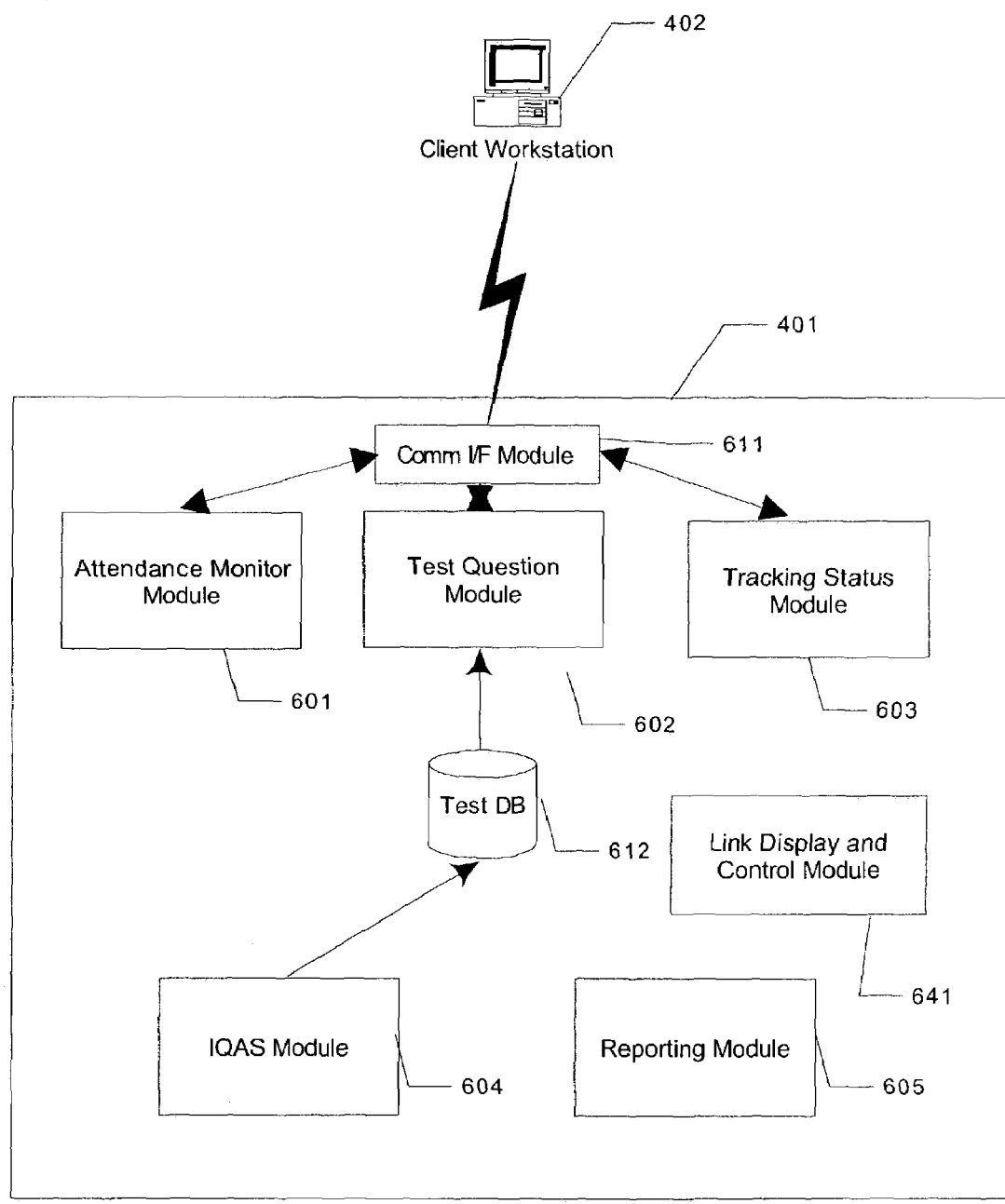
FIG. 6 illustrates a set of processing modules utilized within an instructor control unit workstation configured in accordance with an embodiment of the present invention.

FIG. 6 illustrates a set of processing modules utilized within an instructor control unit workstation configured in accordance with an embodiment of the present invention. The instructor control unit workstation includes an attendance monitor module 601, a test question module 602, a tracking status module 603, an Instructor Question Authoring System (IQAS) module 604, and a reporting module 605. In addition, the instructor control unit workstation includes a database of test questions 612 generated by the IQAS module 604 and used by the test question module 602 to transmit to a client workstation 402.

The attendance monitor module 601 collects and records attendance data from attendance modules on individual client workstations for display to an instructor as well as making a permanent entry in a student's record. The test question module 602 sends the test questions needed by the client's workstation's when testing, quizzes, and polling occurs. These questions are obtained from a database of test questions 612 as needed. The tracking status module 603 collects the real-time tracking and status information from the tracking status modules in the client workstations and displays the results to an instructor.

The Instructor Question Authoring System (IQAS) module 604 provides instructors with a mechanism to develop tests for presentation to students using the very best questions/answers possible. The instructor develops and stores questions into the question database 612. As each question is used over time, the database maintains a history file indicating the number of times a question has been used and the percentage of correct and incorrect answers obtained from students.

To create a test, an instructor selects questions from the database for inclusion in a particular test. In one embodiment, this selection of questions is made from a list of available questions presented to the instructor on a monitor. The entire set of questions may be saved as a test for use any number of times at a later date. The instructor may indicate the order in which questions may be presented as well as indicate that the questions are to be randomly presented if desired. The list of questions presented to the instructor may be sorted by any number of characteristics describing the question including most used questions, least used questions, most often answered correctly, most often answered incorrectly, 'trick' questions or other user defined categories, question author, question created and last saved date, and any other characteristic maintained by the database. The questions may also be automatically 'weighted' to adjust an expected difficulty for the test. In addition, new questions may be created by an instructor for inclusion within a test that are not saved in the question database 612 for later use.

Finally, the reporting module 605 provides an instructor with a mechanism for viewing and outputting a set of results from tests for review. These reports may be for individual tests, individual students, or combination of students as desired. Any of the information collected by the other modules may be organized and output for use by an instructor and student. The output may be in electronic form to a display device attached to any workstation, may be in the form of a record entry stored in a student record database, and may be in the form of a hardcopy report printed on a printer without deviating from the spirit and scope of the present invention as recited within the attached claims.

Figure 7:
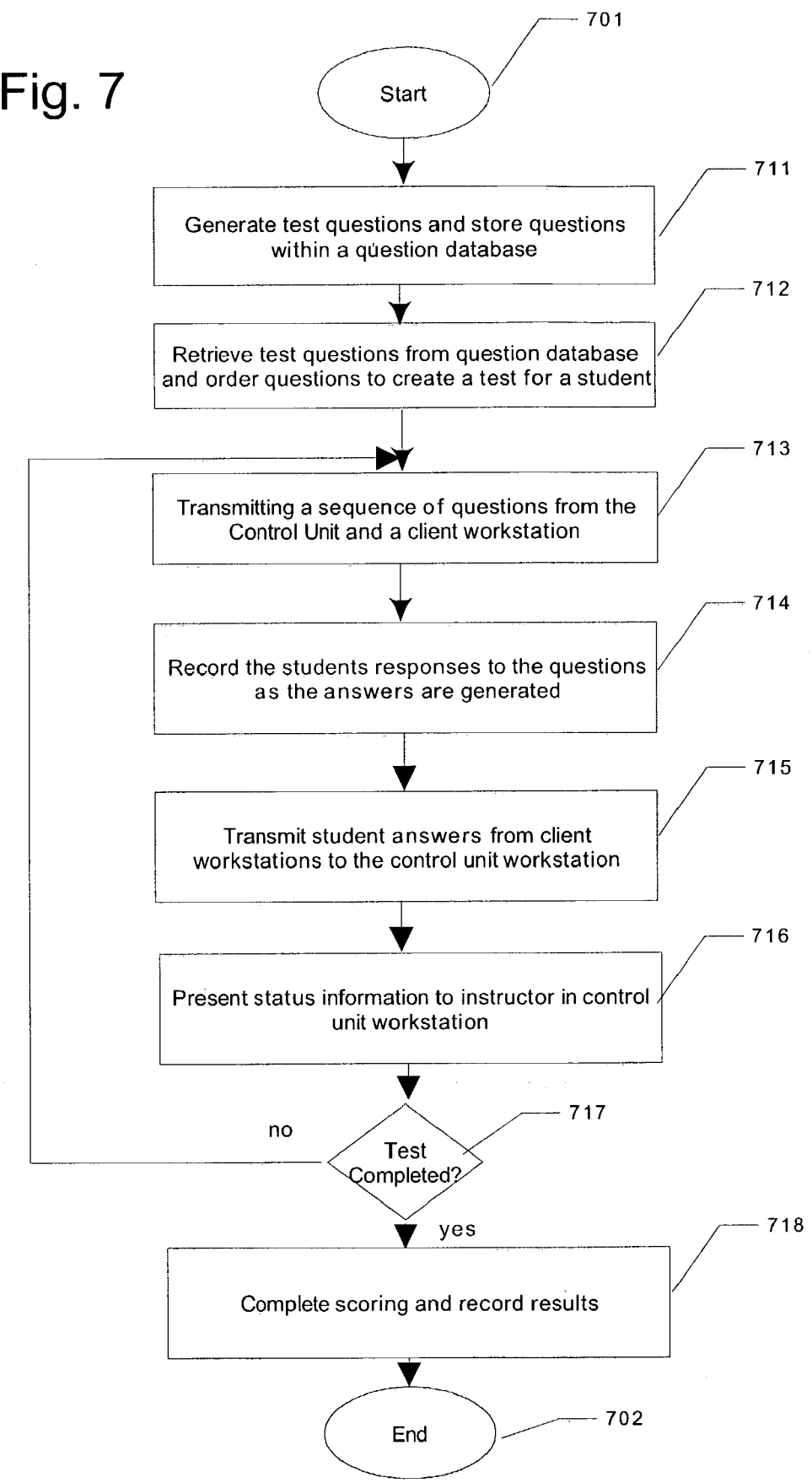
FIG. 7 illustrates a operational flow for the operations of a process for communications between workstations according to an example embodiment of the present invention.

FIG. 7 illustrates a operational flow for the operations of a process for communications between workstations according to an example embodiment of the present invention. To provide instructor services, the processing begins at 701 and a set of test questions are generated by an instructor and stored within a database in module 711. Once all of the questions are created and stored, an instructor generates a test in module 712 retrieving a number of questions from the questions database. This test may be saved if desired for later use.

Once a test has been generated, a test begins with a transmission of one or more questions from the central control unit workstation to the students at client's workstations in module 713. The students record their answers to the question in module 714 in the client workstations before the answers are sent to the control unit workstation in module 715. These answers may be sent to the control unit workstation asynchronously once the answers are entered or periodically as requested by the control unit workstation.

The status of the students, whether they are logged into a workstation, which questions have been answered and the score for the answered questions may be presented to the instructor on a display of the control unit workstation in real-time as a test is being taken using module 716. Decision module 717 determines if the test has concluded. The start and end of a test may be defined by a fixed period of time, may be defined by a number of questions that all must be answered by all students taking a test, and may be defined using manual inputs from an instructor on the control unit workstation. If the decision module 717 determines that the test has not ended, the processing returns to module 713 to send additional questions to students. The processing through this instruction loop continues until the test ends. Once the end of the test is detected by decision module 717, the processing ends at 702 after module 718 scores and records the results of the test for later display and analysis.

The embodiments described herein are implemented as logical operations performed by a computer. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

While the above embodiments of the present invention describe a system and method for connecting a plurality of computing systems within an educational setting, one skilled in the art will recognize that the use of the processing system discussed above is merely example embodiment of the present invention. As long as a connection table is used to configure elements of an educational computing system, the present invention would be useable in other data processing systems. It is to be understood that other embodiments may be utilized and operational changes may be made without departing from the scope of the present invention as recited in the attached claims.

As such, the foregoing description of the exemplary embodiments of the invention have been presented for the purposes of illustration and description. They are not intended to be exhaustive or to limit the invention to the precise forms disclosed. Many modifications and variations are possible in light of the above teaching. It is intended that the scope of the invention be limited not with this detailed description, but rather by the claims appended hereto. The present invention is presently embodied as a method, apparatus, and a computer data product containing a computer program for providing instruction services within a multi-computer processing system. Since many embodiments of the invention can be made without departing from the spirit and scope of the invention, the invention resides in the claims hereinafter appended.

What is claimed is:

1. A system for connecting a plurality of computing systems to a single network, the system comprising:
   a plurality of client workstations;
   a control unit configured to monitor the operation of the plurality of client workstations; and
   a communications network that facilitates transmission of data and commands between the control unit and the plurality of client workstations, the communications network being a Transmission Control Protocol/Internet Protocol (TCP/IP) based communications network;
   wherein the control unit comprises:
      a test question database containing test questions; and
      an instructor question authoring system (IQAS) module that:
         (i) during creation of a test, automatically calculates, for each of the test questions, a weight that indicates an expected difficulty of the test question; and
         (ii) enables a user of the control unit to select ones of the test questions for inclusion in the test based on the weights;
      a test question module that retrieves test questions in the test from the test question database for presentation to users of the client workstations; and
      a testing module that initiates the test by transmitting, via the communications network, the test questions in the test to the client workstations in response to input from the user of the control unit;
   wherein the client workstations are configured such that when the client workstations receive the questions, the client workstations present the questions to the users of the client workstations independent of the activities performed by the users of the client workstations;
   wherein each of the plurality of client workstations accepts responses from the users of the client workstations to the questions presented;
   wherein each of the plurality of client workstations provides to the control unit status of the responses received from the users of the client workstations to the test questions;
   wherein the control unit is configured to present an interface to the user of the control unit;
   wherein the interface displays, for each of the users of the client workstations, a status that indicates whether the user of the client workstation is logged in, which of the questions the user of the client workstation has answered, and a score for the questions that the user of the client workstation has answered; and
   wherein the control unit is configured to update the interface in real-time as the responses are received from the plurality of client workstations.

2. The system according to claim 1, wherein the control unit transmits command packets over the communications network to the plurality of client workstations to display the test questions transmitted by the control unit.

3. The system according to claim 1, wherein the control unit comprises:
   an attendance monitor module that records and presents a user attendance report; and
   a tracking status module that obtains real-time status data for users of the client workstations responding to test questions.

4. The system according to claim 1,
   wherein the database contains a history file that indicates question characteristics for each of the test questions; and
   wherein the IQAS module enables the user of the control unit to select test questions for inclusion on the test using at least one of the question characteristics.

5. The system according to claim 4,
   wherein the IQAS module determines at least one of the following question characteristics:
      which test questions are included on a test most frequently,
      which test questions are included on a test least frequently;
      which test questions are answered correctly most often;
      which test questions are answered incorrectly most often;
      an author of each test question;
      a creation date of each test question; and
      a last saved date of each test question; and
   wherein the question characteristics comprise at least one of the group consisting of the test questions most frequently included on a test, the test questions least frequently included on a test, the test questions most often answered correctly, the test questions most often answered incorrectly, user defined categories, a test question author, a test question creation date, and a test question last saved date.

6. The system according to claim 1, wherein the communications network is a wireless communications network.

7. The system according to claim 6, wherein the wireless communications network uses an RF transmission signal to transmit the test questions and the responses.

8. The system according to claim 7, wherein the wireless communications network utilizes the IEEE 802.11 communications protocol to transmit the test questions and the responses.

9. The system according to claim 1, wherein one of the client workstations comprises:
   an attendance module that records when a user of the client workstation is present; and
   a tracking/status module that maintains the status of the user of the client workstation during the test for transmission to the control unit.

10. The system according to claim 9, wherein the attendance module comprises:
    a log-in module that records when the user of the client workstation logs into the client workstation;
    a log-out module that records when the user of the client workstation has completed a task and logged out of the client workstation; and
    a record module that maintains a login status of the user of the client workstation and that provides the login status to the control unit.

11. The system according to claim 1, wherein the testing module comprises:
    a random testing module that provides the test questions in the test to the client workstations in a random order.

12. The system according to claim 1, wherein the test questions comprise multiple choice, true/false, yes/no, fill-in-the blank, and essay questions.

13. A method for connecting a plurality of computing systems to a wireless communications network for providing instructor services in a distributed computing environment, the method comprising:
    generating test questions;
    storing the test questions within a question database;
    during creation of a test, automatically calculating, for each of the test questions, a weight that indicates an expected difficulty of the test question;

receiving, at a control unit, independent of activities performed by users of client workstations, selection input from a user of the control unit that indicates a selection of the test questions for inclusion in the test based on the weights;

retrieving, in response to the input, at least some of the test questions in the test from the question database;

after retrieving the test questions, initiating the test by transmitting, via the wireless communications network, a sequence of the test questions of in the test from the control unit to at least one client workstation in a plurality of client workstations that are configured such that when the client workstations receive the test questions, the client workstations present the sequence of test questions to users of the client workstations independent of the activities performed by the users of the client workstations;

recording responses to the sequence of test questions as the users of the client workstations generate the responses;

transmitting, via the wireless communications network, the responses from the client workstations to the control unit as the users of the client workstations generate the responses;

presenting status information in real-time, indicating a status of each of the users of the client workstations to an instructor on the control unit; and once the test is completed, scoring the responses and displaying the scored responses on a status board on the control unit.

14. The method according to claim 13, wherein generating test questions includes generating the test questions comprising multiple choice, true/false, yes/no, fill-in-the blank, and essay questions.

15. The method according to claim 13, wherein the wireless communications network uses an RF transmission signal to transmit the questions and the responses.

16. The method according to claim 15, wherein the wireless communications network utilizes the IEEE 802.11 communications protocol to transmit the questions and the responses.

17. A method comprising:

storing a set of test questions in a test question database;

during creation of a test, automatically calculating, at a control unit, for each of the test questions, a weight that indicates an expected difficulty of the test question;

receiving, from a user of the control unit, selection input that indicates a selection of the test questions for inclusion in the test based on the weights;

receiving, at the control unit, independent of activities performed by users of a plurality of client workstations, input from the user of the control unit;

in response to receiving the input, retrieving test questions in the test from the test question database;

in response to retrieving the test questions in the test, initiating the test by transmitting the test questions in the test from the control unit to the client workstations;

after receiving the test questions in the test, displaying the test questions in the test on the client workstations independent of activities performed by the users of the client workstations;

receiving responses on each of the client workstations in response to displaying the plurality of questions in the test;

transmitting the responses received on each of the client workstations to the control unit;

using the responses to track status information of each of the client workstations; and displaying a status board indicating the status information of each of the client workstations on the control unit in real-time.

18. The method of claim 17, wherein displaying the status information in real-time includes displaying the responses received on each of the client workstations as the responses are received.

19. The method of claim 17, wherein displaying the test questions in the test on the plurality of client workstations comprises displaying the test questions in the test in a first sequence on a first one of the client workstations and displaying the test questions in the test in a second sequence on a second one of the client workstations, wherein the first sequence is different from the second sequence.

20. A method comprising:

retrieving a plurality of test questions from a question database at a control unit;

during creation of a test, automatically calculating, for each of the test questions, a weight that indicates an expected difficulty of the test question;

in response to retrieving the test questions, displaying on the control unit the plurality of test questions to an instructor;

receiving instructions from the instructor indicating a selection of a subset of test questions of the plurality of test questions based on the weights;

receiving instructions from the instructor indicating a desired order of the test questions of the subset;

sorting the test questions of the subset into the desired order;

initiating the test by transmitting the subset of test questions from the control unit to a plurality of client workstations that are configured such that when the client workstations receive the test questions of the subset, the client workstations present the test questions of the subset in the desired order to users of the client workstations independent of the activities performed by the users of the client workstations;

receiving a response to each test question of the subset from each of the client workstations;

using the responses to track status information of each of the client workstations; and displaying in real-time a status board indicating the status information of each of the client workstations on the control unit.

* * * * *